June 10, 1958 — C. R. COURTENAY — 2,837,867
CONSTANT FEED PLANT WATERING APPARATUS
Filed Aug. 1, 1955
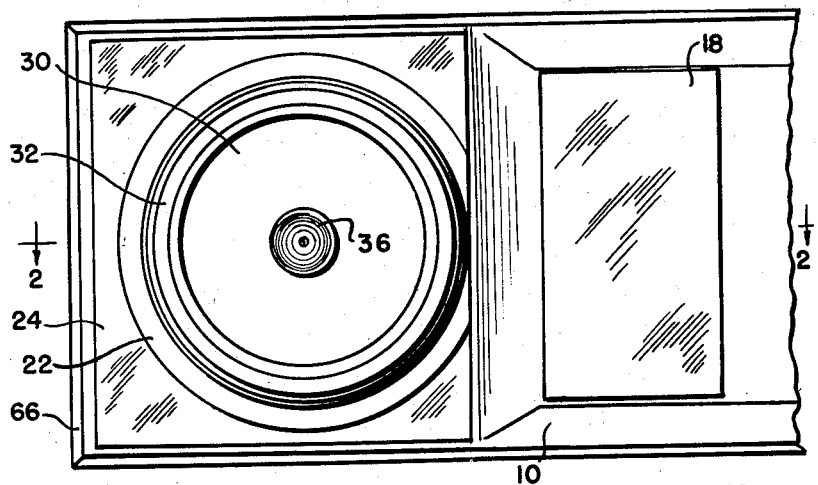
FIG. 1
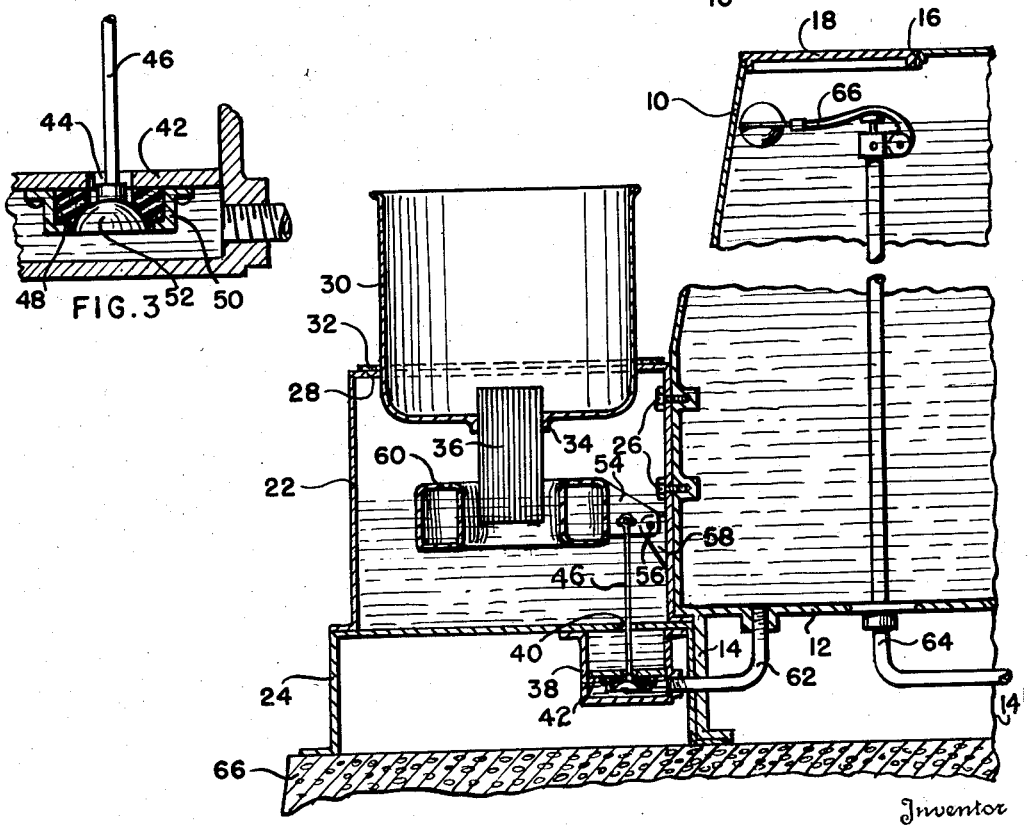
FIG. 3
FIG. 2
Inventor
CHARLES R. COURTENAY
By J. P. Keiper
Attorney

United States Patent Office 2,837,867
Patented June 10, 1958

2,837,867

CONSTANT FEED PLANT WATERING APPARATUS

Charles R. Courtenay, Watertown, N. Y.

Application August 1, 1955, Serial No. 525,620

1 Claim. (Cl. 47—38)

This invention relates to plant watering devices and more particularly to the accurate control over the supply of water so as to render such devices especially susceptible of use in combination with hollow cemetery markers which may act as a water reservoir.

Plant watering devices in general provide either an uneven supply or excess supply, either of which results in substantial loss of water through direct evaporation. The quantity of water used under such circumstances is such as to require frequent replenishment of the supply. If a water supply system is employed, considerable wastage results. Cemetery watering devices because remotely located generally receive spasmodic attention with the result that proper care of plants is lacking. The supply of water, particularly if used to water plants in a wasteful manner in connection with a substantially number of cemetery markers, would tax the generally available, but limited supply of water.

It is an object of the present invention to provide a plant watering device capable of using water in a steady manner, but sparingly, whereby either a minimum drain on the supply results, or a moderate reservoir may be effective to supply water over a long period without replenishment.

It is a further object of the invention to provide a plant watering device capable of economical use of water, so that an ordinary grave marker, if made hollow to serve as a reservoir, may suffice to provide adequate water, requiring infrequent replenishment.

A further object of the invention is to provide a plant watering device in which the plant is watered by a wick feed from a substantially closed receptacle, in which a predetermined water level is accurately maintained, whereby sufficient water may be supplied the plant, efficiently and without waste.

Still another object of the invention is to provide a constant level reservoir from which water can be wick fed to plant life at a steady slow rate of feed, and in which the reservoir is provided with a float feed adapted to admit water from an adjacent reserve supply of relatively low head pressure.

The above and other novel features of the invention will appear more fully from the following detailed description when taken in conjunction with the accompanying drawings. It is expressly understood, however, that the drawings are employed for purposes of illustration only and are not designed as a definition of the limits of the invention, reference being had for this purpose to the appended claim.

In the drawings wherein like reference characters indicate like parts:

Figure 1 is a top plan view of the plant watering device and grave marker, a portion of the latter being broken away;

Figure 2 is a sectional view taken substantially on the line 2—2 of Figure 1; and Figure 3 is an enlarged sectional fragmentary view of the valve shown in Figure 2.

In Figures 1 and 2 there is shown a hollow tombstone or grave marker 10, the main body portion of which may be formed of an aluminum casting, such casting having a raised bottom 12 and a supporting skirt or flange 14, and a top opening 16 provided with a lid 18. Adjoining the marker is a constant level water reservoir and plant holder or receptacle, the reservoir comprising a casing 22 mounted upon a base 24, the casing and base being adapted to interfit against the lower portion of one side of the tombstone and be affixed thereto as by bolts 26. The casing 22 may be circular as shown and have an inwardly extending flange 28 at the top thereof, defining an aperture in which may be set a plant receptacle 30. The receptacle is provided with an integral flange 32 adapted to rest upon the flange 28 of the casing 22, and the receptacle bottom is provided with an aperture 34 in which is positioned a heavy wick 36, which may be formed of cellulosic sponge or other suitable material capable of lifting water by capillary attraction.

The base 24 is provided with a valve chamber 38 which communicates with the interior of the casing 22 by a port 40 in the base 24. The valve chamber is provided with a partition 42 having an inlet aperture 44 through which extends a valve rod 46. Against the underside of the partition 42 and surrounding the aperture 44, is a valve gasket 48 held in place by a flanged ring 50. The lower end of the valve rod 46 is provided with a valve head 52 adapted to cooperate with the gasket 48 to control the flow of water. The valve rod 46 extends upwardly into the reservoir formed by the casing 22 and is attached to a float lever 54 which is fulcrumed as at 56 to a bracket 58 on the internal side wall of the casing 22. The float lever 54 is provided with an annular closed chamber 60 which is arranged in alignment with and surrounds the lower end of the wick 36. The length of the wick 36 in respect to the level of the water within the casing 22 as regulated by the float, is so chosen as to provide the desired transmission of water into the plant receptacle 30.

The grave marker casing acts as a reservoir for water and the bottom 12 thereof is connected by a pipe 62 which extends to the valve chamber 38 below the partition 42, whereby water may flow from the marker reservoir into the valve chamber under a relatively low pressure head. The marker reservoir may be filled manually through the cover 18 if desired, or may be provided with a water supply pipe such as 64 extending upwardly within the marker, the supply pipe being provided with a float valve 66. In practice, the marker and associated plant receptacle water supply therefore may be mounted on a concrete or other suitable base such as 66, and if desired the plant receptacle and constant level water reservoir may be arranged on a lower level, or in part recessed in the foundation block 66.

In practice the plant receptacle will be partly filled with peat moss, over which is provided a bed of earth in which the plant life is rooted. The constant level maintained within the reservoir, in combination with the wick feed serves to deliver water in a sparing fashion to the peat moss, whence the moisture fans out and supplies the earth thereabove containing the plant roots. By the system thus described the upper exposed surface of the earth is not maintained moist, which would result in wastage and evaporation. The system supplies the needs of the plant life directly to the roots in the lower region of the receptacle, and thus unnecessary evaporation is avoided.

The adjacent headstone serves to provide a substantial supply of water, and the supply, as well as the constant level reservoir, are both closed so as to minimize evaporation. In fact, the only escape for water is by the path provided through the wick, and by the choice of wick cross section, the length thereof, and the level of water maintained, an exceedingly steady slow feed is provided.

It will at once be appreciated that as a result of the arrangement thus described, the hollow marker may serve as a reservoir which would need replenishment only infrequently, or if desired such marker may be provided with a float feed fill connected with a water supply pipe. The arrangement in any event utilizes water so economically that a limited supply of water may serve to adequately water a great number of such plant receptacles of the type described.

It will also be appreciated that the marker, being hollow and of cast aluminum, will be light to handle, readily installed, of a permanent nature and capable of serving an additional useful purpose, namely the provision of a low head water supply, which is easily and accurately controlled by a relatively simple float valve mechanism, such as that shown in the constant level reservoir.

While a single modification of the invention has been illustrated and described, it is to be understood that the invention is not limited thereto. As various changes in the construction and arrangement may be made without departing from the spirit of the invention, as will be apparent to those skilled in the art, reference will be had to the appended claim for a definition of the limits of the invention.

What is claimed is:

A cemetery plant watering device comprising a hollow marker adapted to serve as a water reservoir, a float valve reservoir located adjacent said marker and having a conduit connecting with the water reservoir, an annular hollow float hingedly mounted on a side wall and located centrally within said float valve reservoir, a valve in said conduit having an actuating connection with said float whereby to maintain a constant liquid level within said valve reservoir, and a plant receptacle located above said float valve reservoir, and acting as a closure therefor, said receptacle having an aperture in the bottom thereof in alignment with said annular float, and a wick projecting through said aperture and into said receptacle, and extending downwardly below the liquid level of said valve reservoir, and axially through the annular float.

References Cited in the file of this patent

UNITED STATES PATENTS

| | | |
|---|---|---|
| 2,084,005 | Richards | June 15, 1937 |
| 2,249,197 | Brundin | July 15, 1941 |
| 2,556,522 | Cienfuegos | June 12, 1951 |
| 2,713,753 | Luipersbek | July 26, 1955 |